US008970452B2

(12) United States Patent
Wheeler et al.

(10) Patent No.: US 8,970,452 B2
(45) Date of Patent: Mar. 3, 2015

(54) IMAGING METHOD

(75) Inventors: Aaron Joseph Wheeler, San Francisco, CA (US); Hayes Solos Raffle, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 460 days.

(21) Appl. No.: 13/287,390

(22) Filed: Nov. 2, 2011

(65) Prior Publication Data

US 2013/0106674 A1    May 2, 2013

(51) Int. Cl.
*G09G 5/00*    (2006.01)
*G02B 27/01*    (2006.01)

(52) U.S. Cl.
CPC ...... *G02B 27/017* (2013.01); *G02B 2027/0138* (2013.01); *G02B 2027/0187* (2013.01)
USPC .......................................................... 345/8

(58) Field of Classification Search
None
See application file for complete search history.

(56) References Cited

U.S. PATENT DOCUMENTS

| | | |
|---|---|---|
| 6,307,526 B1 | 10/2001 | Mann |
| 7,401,920 B1 | 7/2008 | Kranz |
| 7,542,210 B2 | 6/2009 | Chirieleison, Sr. |
| 8,611,015 B2 | 12/2013 | Wheeler et al. |
| 2002/0180799 A1 | 12/2002 | Peck et al. |
| 2003/0020755 A1 | 1/2003 | Lemelson et al. |
| 2003/0098954 A1 | 5/2003 | Amir et al. |
| 2004/0174496 A1 | 9/2004 | Ji et al. |
| 2006/0082542 A1 | 4/2006 | Morita et al. |
| 2006/0110008 A1 | 5/2006 | Vertegaal et al. |
| 2007/0273610 A1 | 11/2007 | Baillot |
| 2009/0018419 A1 | 1/2009 | Torch |
| 2011/0019874 A1 | 1/2011 | Jarvenpaa |
| 2011/0077548 A1 | 3/2011 | Torch |
| 2011/0109880 A1 | 5/2011 | Nummela |
| 2012/0086788 A1* | 4/2012 | Wada .............................. 348/56 |
| 2012/0120498 A1* | 5/2012 | Harrison et al. .............. 359/630 |
| 2013/0128364 A1 | 5/2013 | Wheeler et al. |

FOREIGN PATENT DOCUMENTS

| | | |
|---|---|---|
| JP | 2004-280127 A | 10/2004 |
| JP | 2009-157634 A | 7/2009 |
| KR | 10-2004-0027764 | 4/2004 |
| KR | 10-2010-0006652 | 1/2010 |

(Continued)

OTHER PUBLICATIONS

PCT International Search Report and Written Opinion, PCT International Application No. PCT/US2012/060846 dated Mar. 28, 2013.

(Continued)

*Primary Examiner* — David D Davis
(74) *Attorney, Agent, or Firm* — McDonnell Boehnen Hulbert & Berghoff LLP

(57) ABSTRACT

A wearable computing device or a head-mounted display (HMD) may be configured to track the gaze axis of an eye of the wearer. In particular, the device may be configured to observe movement of a wearer's pupil and, based on the movement, determine inputs to a user interface. For example, using eye gaze detection, the HMD may change a tracking rate of a displayed virtual image based on where the user is looking. Gazing at the center of the HMD field of view may, for instance, allow for fine movements of the virtual display. Gazing near an edge of the HMD field of view may provide coarser movements.

14 Claims, 14 Drawing Sheets

(56) References Cited

FOREIGN PATENT DOCUMENTS

KR 10-1049605 B1 7/2011
WO WO2009089342 A1 7/2009

OTHER PUBLICATIONS

Arrington Research, "ViewPoint EyeTracker, Software User Guide," May 28, 2009, Scottsdale, AZ, pp. 1-234.

Borah, Joshua, "Technology and Application of Gaze Based Control," RTO Lecture Series on Alternative Control Techniques: Human Factors Issues, Bretigny, France, Oct. 7, 1998, pp. 3-1 to 3-10.
Gilson et al., "An automated calibration method for non-see-through head mounted displays," Journal of Neuroscience Methods, 2011, vol. 199, Issue 2, pp. 328-335.
Lastra, et al., "Course Notes Programming Virtual Worlds," SIGGRAPH 97, Aug. 8, 1997, Los Angeles, CA, 277 pages.

* cited by examiner

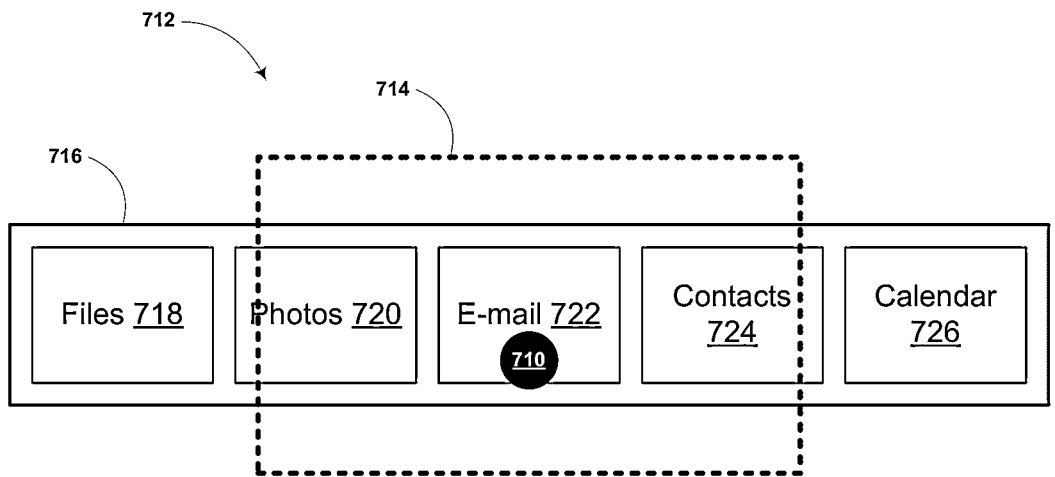
Figure 7B     At HMD position 704, HMD moving forward
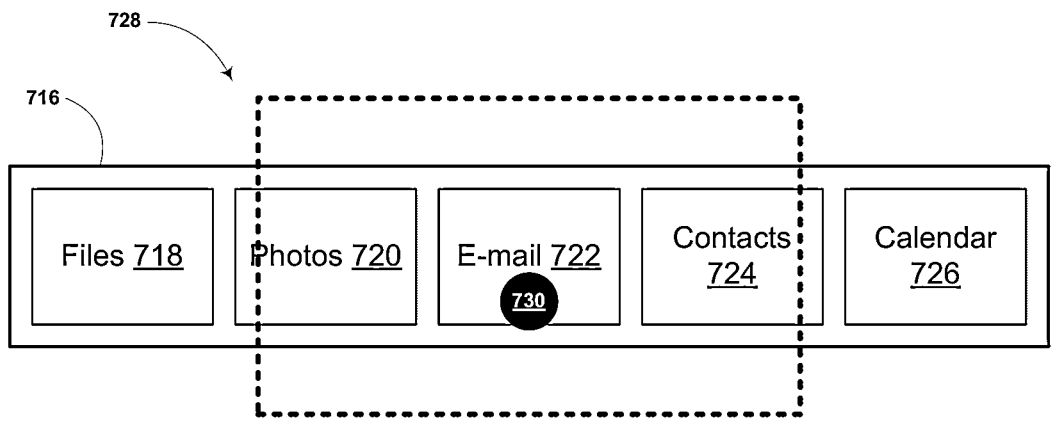
Figure 7C     At HMD position 706, HMD moving forward

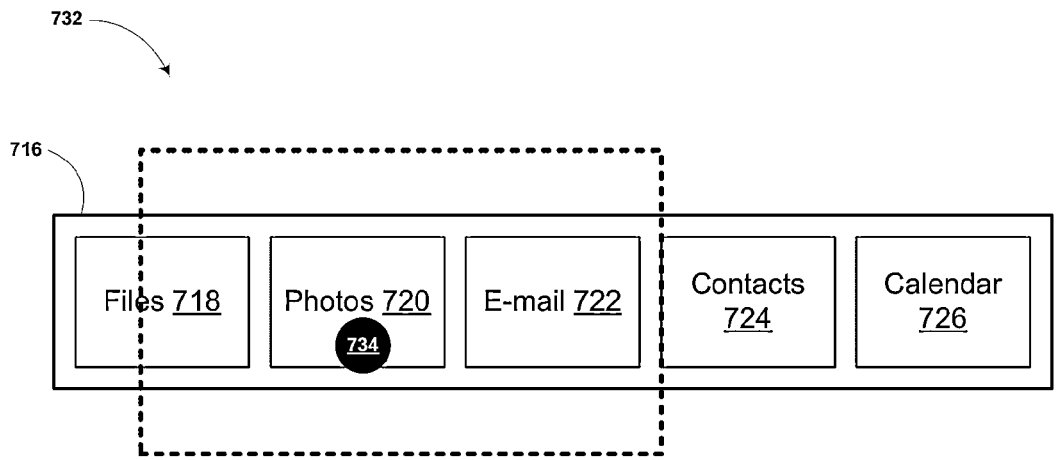
Figure 7D — At HMD position 708, HMD moving forward and rotating left (uncorrected)
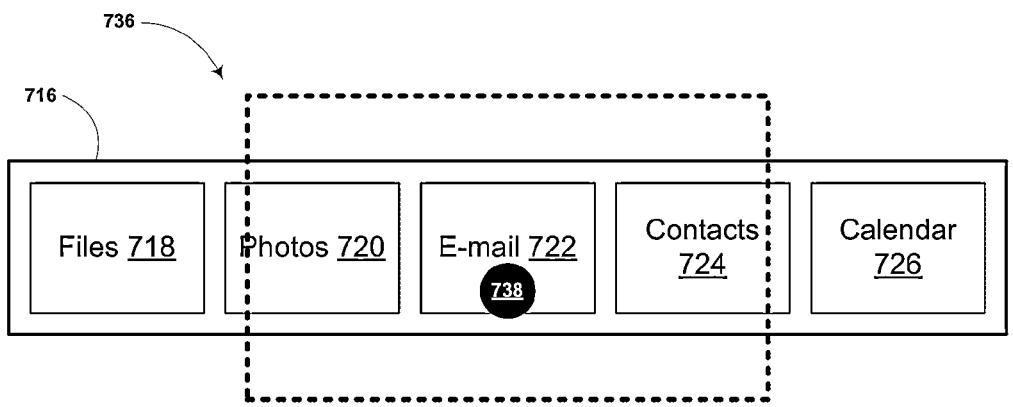
Figure 7E — At HMD position 708, HMD moving forward and rotating left (corrected with eye gaze information)

IMAGING METHOD

BACKGROUND

Wearable systems can integrate various elements, such as miniaturized computers, input devices, sensors, detectors, image displays, wireless communication devices as well as image and audio processors, into a device that can be worn by a user. Such devices provide a mobile and lightweight solution to communicating, computing and interacting with one's environment. With the advance of technologies associated with wearable systems and miniaturized optical elements, it has become possible to consider wearable compact optical displays that augment the wearer's experience of the real world.

By placing an image display element close to the wearer's eye(s), an artificial image can be made to overlay the wearer's view of the real world. Such image display elements are incorporated into systems also referred to as "near-eye displays", "head-mounted displays" (HMDs) or "heads-up displays" (HUDs). Depending upon the size of the display element and the distance to the wearer's eye, the artificial image may fill or nearly fill the wearer's field of view.

SUMMARY

In a first aspect, a head-mounted display (HMD) is provided. The HMD includes a head-mounted support, an optical system, an infrared light source, a camera, and a computer. The optical system is attached to the head-mounted support and includes a display panel configured to generate a virtual image, wherein the virtual image is viewable from a viewing location. The infrared light source is configured to illuminate the viewing location with infrared light such that infrared light is reflected from the viewing location as reflected infrared light and the camera is configured to image the viewing location by collecting the reflected infrared light. The computer is configured to determine a gaze axis based on one or more images of the viewing location obtained by the camera and control the display panel to move the virtual images within a field of view based on the gaze axis, a reference axis related to the HMD, and a tracking rate.

In a second aspect, a method is provided. The method includes determining a gaze axis within a field of view of a head-mounted display (HMD), wherein the HMD is configured to display virtual images within the field of view. The method further includes determining a reference axis related to the HMD, adjusting a tracking rate based on the gaze axis and the reference axis, and moving the virtual images within the field of view based on the gaze axis, the reference axis and the tracking rate.

In a third aspect, a non-transitory computer readable medium is provided. The non-transitory computer readable medium includes instructions executable by a computing device to cause the computing device to perform functions including, receiving eye-tracking images from a head-mounted display (HMD), wherein the HMD is configured to display virtual images within a field of view. The non-transitory computer readable medium further includes determining a gaze axis from the eye-tracking images, determining a reference axis related to the HMD, calculating an angle difference between the gaze axis and the reference axis, and adjusting a tracking rate based on the angle difference. The non-transitory computer readable medium further includes controlling the HMD to display the virtual images based upon the gaze axis, the reference axis, and the tracking rate.

BRIEF DESCRIPTION OF THE DRAWINGS

FIG. 7B is a field of view of a HMD user interface, in accordance with an example embodiment.

FIG. 7C is a field of view of a HMD user interface, in accordance with an example embodiment.

FIG. 7D is a field of view of a HMD user interface, in accordance with an example embodiment.

FIG. 7E is a field of view of a HMD user interface, in accordance with an example embodiment.

DETAILED DESCRIPTION

Figure 1:
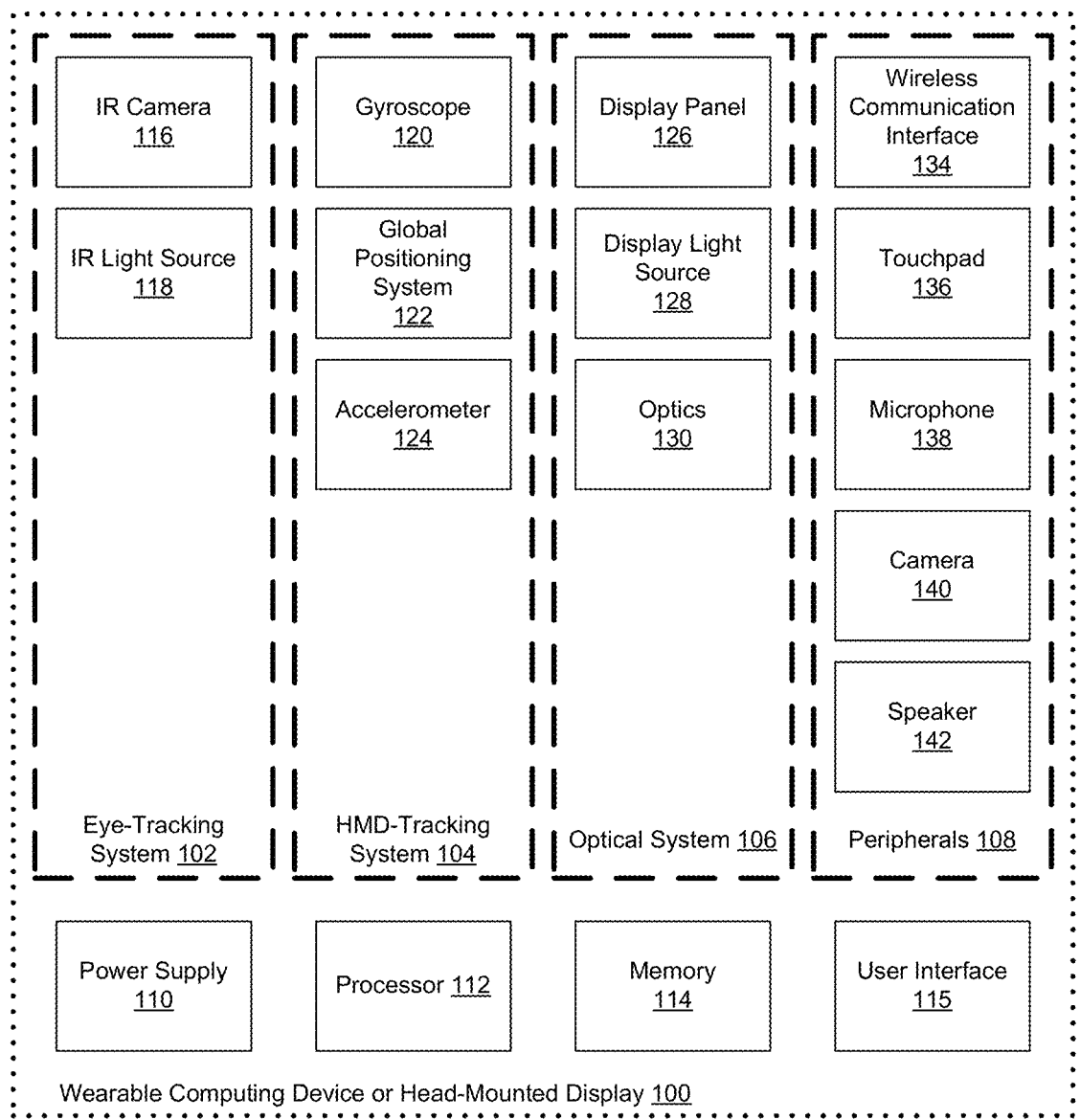
FIG. 1 is schematic diagram of a wearable computing device, in accordance with an example embodiment.

In the following detailed description, reference is made to the accompanying figures, which form a part thereof. In the figures, similar symbols typically identify similar components, unless context dictates otherwise. The illustrative embodiments described in the detailed description and figures are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

1. Overview

A head-mounted display (HMD) may enable its wearer to observe the wearer's real-world surroundings and also view a displayed image, such as a computer-generated image. In some cases, the displayed image may overlay a portion of the wearer's field of view of the real world. Thus, while the wearer of the HMD is going about his or her daily activities, such as walking, driving, exercising, etc., the wearer may be able to see a displayed image generated by the HMD at the same time that the wearer is looking out at his or her real-world surroundings.

The displayed image, also known as a virtual image, might include, for example, graphics, text, and/or video. The content of the displayed image could relate to any number of contexts, including but not limited to the wearer's current environment, an activity in which the wearer is currently engaged, the biometric status of the wearer, and any audio, video, or textual communications that have been directed to the wearer. The images displayed by the HMD may also be part of an interactive user interface. For example, the HMD could be part of a wearable computing device. Thus, the images displayed by the HMD could include menus, selection boxes, navigation icons, or other user interface features that enable the wearer to invoke functions of the wearable computing device or otherwise interact with the wearable computing device.

The images displayed by the HMD could appear anywhere in the wearer's field of view. For example, the displayed image might occur at or near the center of the wearer's field of view, or the displayed image might be confined to the top, bottom, or a corner of the wearer's field of view. Alternatively, the displayed image might be at the periphery of or entirely outside of the wearer's normal field of view. For example, the displayed image might be positioned such that it is not visible when the wearer looks straight ahead but is visible when the wearer looks in a specific direction, such as up, down, or to one side. In addition, the displayed image might overlay only a small portion of the wearer's field of view, or the displayed image might fill most or all of the wearer's field of view. The displayed image could be displayed continuously or only at certain times (e.g., only when the wearer is engaged in certain activities).

The displayed images may appear fixed relative to the wearer's environment. For instance, the virtual images may appear anchored to a particular object or location within the wearer's environment. Alternatively, displayed images may appear fixed relative to the wearer's field of view. For example, the HMD may include a graphical user interface that may stay substantially anchored to the wearer's field of view regardless of the HMD orientation. In practice, both types of virtual imagery may be implemented together in an HMD.

To display a virtual image to the wearer, an optical system in the HMD may include a light source, such as a light-emitting diode (LED), that is configured to illuminate a display panel, such as a liquid crystal-on-silicon (LCOS) display. The display panel generates light patterns by spatially modulating the light from the light source, and the light patterns may be viewable as virtual images at a viewing location.

The HMD may obtain data from the wearer in order to perform certain functions, for instance to provide context-sensitive information to the wearer. In an example embodiment, the HMD may obtain information regarding the wearer and the wearer's environment and respond accordingly. For instance, the HMD may use a pupil position recognition technique, wherein if the HMD recognizes that the wearer's pupil location, and thus a corresponding gaze axis, is inclined with respect to a reference axis, the HMD may display virtual images related to objects located above the wearer. Conversely, the HMD may recognize, by a similar pupil position recognition technique, that the wearer is looking downward. Accordingly, the HMD may display virtual images related to objects located below a reference axis of the wearer.

In order to determine the actual position of a HMD wearer's pupil and to determine a corresponding gaze axis, the wearer's pupil may be illuminated by an infrared light source or multiple infrared light sources. An infrared camera may image the pupil. The infrared light source(s) could be located in the HMD optical path, or could alternatively be located off-axis. The infrared camera could also be located in the HMD optical path or off-axis. Possible eye tracking modalities that could be used include dark pupil imaging and dual-glint Purkinje image tracking, among other techniques known in the art.

A processor may implement an image processing algorithm to find the edges or extents of the imaged pupil. The image processing algorithms may include pattern recognition, Canny edge detection, thresholding, contrast detection, or differential edge detection, to name a few. Those skilled in the art will understand that a variety of different image processing techniques could be used individually or in combination with other methods in order to obtain pupil location. After image processing, the processor may determine a gaze axis, which may be defined as an axis extending from a viewing location and through a gaze point located within the wearer's field of view.

The processor may also determine a reference axis, which may be defined as an axis extending from a viewing location and through a point in space. The point in space may include the apparent center of the display of the HMD or a target object, among other possibilities.

Once a gaze axis is determined, the processor may act to adjust various components of the displayed virtual image based on an angle difference between the gaze axis and the reference axis and a tracking rate. For example, an upward scrolling list of text information may be presented to a user of an HMD, similar to the traditional display of credits at the end of a movie. In this embodiment, the reference axis may include an axis that extends through the apparent center of the HMD display. If a gaze axis is determined that indicates the user is gazing down near the bottom of the display with respect to the reference axis, the tracking rate may be increased such that the rate of upward scrolling is increased, providing more text to the user.

Conversely, if a gaze axis is determined that indicates that the user is gazing near the top of the screen with respect to the reference axis, the tracking rate may be decreased such that the rate of upward scrolling is slowed, allowing the user to catch up in reading the text.

Alternatively or additionally, if a gaze axis is determined to be near the reference axis (i.e. the user is looking at the middle of the screen), the tracking rate may be decreased or set to zero (eliminating scrolling of the virtual image). In this respect, a user may be able to focus his/her attention on specific text.

It will be evident to those skilled in the art that there are a variety of ways to implement such virtual image adjustment in a HMD system. The details of such implementations may depend on, for example, the type of data provided, the local environmental conditions, the location of the user, and the task to be performed.

Certain illustrative examples of using eye-tracking data to adjust a virtual image displayed by a HMD are described below. It is to be understood, however, that other embodiments are possible and are implicitly considered within the context of the following example embodiments.

2. Adjusting Virtual Images in a Head-Mounted Display Using Eye-Tracking

FIG. 1 is schematic diagram of a wearable computing device or a head-mounted display (HMD) 100 that may include several different components and subsystems. In one example, HMD 100 includes an eye-tracking system 102, a HMD-tracking system 104, an optical system 106, peripherals, a power supply 110, a processor 112, a memory 114, and a user interface 115. The eye-tracking system 102 may include hardware such as an infrared camera 116 and at least one infrared light source 118. The HMD-tracking system 104 may include a gyroscope 120, a global positioning system (GPS) 122, and an accelerometer 124. The optical system 106 may include, in one embodiment, a display panel 126, a display light source 128, and optics 130. Peripherals 108 may include, for example, a wireless communication interface 134, a touchpad 136, a microphone 138, a camera 140, and a speaker 142.

In an example embodiment, HMD 100 includes a see-through display. Thus, the wearer of HMD 100 may observe a portion of the real-world environment, i.e., in a particular field of view provided by the optical system 106. In addition, HMD 100 is operable to display virtual images that are superimposed on the field of view, for example, to provide an "augmented reality" experience. Some of the virtual images displayed by HMD 100 may be superimposed over particular objects in the field of view. HMD 100 may also display images that appear to hover within the field of view instead of being associated with particular objects in the field of view.

Components of the HMD 100 may be configured to work in an interconnected fashion with other components within or outside their respective systems. For instance, in an example embodiment, the infrared camera 116 may image one or both of the HMD wearer's eyes. The infrared camera 116 may deliver image information to the processor 112, which may access the memory 112 and make a determination regarding the direction of the HMD wearer's gaze, also termed a gaze axis. The processor 112 may further accept input from the GPS unit 122, the gyroscope 120, and/or the accelerometer 124 to determine the location and orientation of the HMD 100. Subsequently, the processor 112 may control the user interface 115 and the display panel 126 to display virtual images to the HMD wearer that may include context-specific information based on the HMD location and orientation as well as the HMD wearer's gaze axis.

HMD 100 could be configured as, for example, eyeglasses, goggles, a helmet, a hat, a visor, a headband, or in some other form that can be supported on or from the wearer's head. Further, HMD 100 may be configured to display images to both of the wearer's eyes, for example, using two see-through displays. Alternatively, HMD 100 may include only a single see-through display and may display images to only one of the wearer's eyes, either the left eye or the right eye. In other embodiments, HMD 100 may include an opaque display configured to display images to a first eye or both eyes of the HMD wearer. In embodiments where an opaque display is presented to the first eye of the HMD wearer, a view of the real-world environment could be available to a second eye of the HMD wearer.

A power supply 110 may provide power to various HMD components and could represent, for example, a rechargeable lithium-ion battery. Various other power supply materials and types known in the art are possible.

The function of the HMD 100 may be controlled by a processor 112 that executes instructions stored in a non-transitory computer readable medium, such as the memory 114. Thus, processor 112 in combination with instructions stored in the memory 114 may function as a controller of HMD 100. As such, processor 112 may control the user interface 115 to adjust what images are displayed by HMD 100. The processor 112 may also control the wireless communication interface 134 and various other components of the HMD 100. The processor 112 may additionally represent a plurality of computing devices that may serve to control individual components or subsystems of the HMD 100.

In addition to instructions that may be executed by the processor 112, the memory 114 may store data that may include a set of calibrated wearer eye pupil positions and a collection of past eye pupil positions. Thus, the memory 114 may function as a database of information related to gaze direction. Such information may be used by HMD 100 to anticipate where the user will look and determine what images are to be displayed to the wearer. Calibrated wearer eye pupil positions may include, for instance, information regarding the extents or range of the wearer's eye pupil movement (right/left and upwards/downwards) as well as wearer eye pupil positions that may relate to various reference axes.

Reference axes could represent, for example, an axis extending from a viewing location and through a target object or the apparent center of a field of view (i.e. the reference axis may correspond to a center line of the field of view). Other possibilities for reference axes exist. Thus, a reference axis may further represent a basis for determining dynamic gaze direction.

In addition, information may be stored in the memory 114 regarding possible control instructions that may be enacted using eye movements. For instance, two consecutive wearer eye blinks may represent a control instruction directing the HMD 100 to capture an image with a peripheral camera 140. Control instructions could also include the dwell-based selection of a target object. For instance, if a wearer fixates visually upon a particular virtual image or real-world object for longer than a predetermined time period, a control instruction may be generated to select the virtual image or real-world object as a target object. Many other control instructions are possible.

In addition to the aforementioned features, memory 114 could store various recorded data from previous HMD/user interactions. For instance, multiple images of a HMD wearer's eye(s) could be averaged to obtain an averaged eye gaze axis. This could lessen the effect of saccadic eye movements or saccades, in which the eye moves in a rapid and somewhat random manner around an eye gaze axis. These saccades help humans build up a mental image of a field of view with better resolution than if the eye remained static, and by averaging a number of eye images within a particular time period, an average gaze axis could be determined with less saccadic 'noise'.

Additionally, memory 114 could store recorded data regarding recent eye gaze axes for various application-based functions. For instance, the recent variance of the eye gaze axis could be coupled to scrolling images generated by the HMD 100. In this embodiment, if recent eye gaze axis variance is high, the images (e.g. text or other images) could scroll faster. If the eye gaze axis variance is low, the images may scroll slower or stop altogether. In this context, a lower variance in eye gaze axis could indicate the HMD wearer is concentrating on one particular gaze location, whereas a higher eye gaze axis variance means the opposite—the HMD wearer may be quickly scanning a document and desire a faster scrolling speed.

Depending on the content that is presented on the HMD display, the variance may differ depending on the axis along which it is measured. For example, the horizontal variance of a HMD wearer's eye gaze may be high while the vertical variance may be relatively low. This could indicate to the HMD 100 that the wearer is reading text. Accordingly, text scrolling/tracking could be adjusted in a different or more controlled fashion compared to 'non-reading' scrolling/panning/pagination situations.

The HMD 100 may include a user interface 115 for providing information to the wearer or receiving input from the wearer. The user interface 115 could be associated with, for example, the displayed virtual images, a touchpad, a keypad, buttons, a microphone, and/or other peripheral input devices. The processor 112 may control the functioning of the HMD 100 based on input received through the user interface 115. For example, the processor 112 may utilize user input from the user interface 115 to control how the HMD 100 displays images within a field of view or determine what images the HMD 100 displays.

The infrared camera 116 may be utilized by the eye-tracking system 102 to capture images of a viewing location associated with the HMD 100. Thus, the infrared camera 116 may image the eye of a HMD wearer that may be located at the viewing location. The images could be either video images or still images. The images obtained by the infrared camera 116 regarding the HMD wearer's eye may help determine where the wearer is looking within the HMD field of view, for instance by ascertaining the location of the HMD wearer's eye pupil. Analysis of the images obtained by the infrared camera 116 could be performed by the processor 112 in conjunction with the memory 114.

The imaging of the viewing location could occur continuously or at discrete times depending upon, for instance, user interactions with the user interface 115. The infrared camera 116 could be integrated into the optical system 106. Alternatively, the infrared camera 116 could be mounted separately from the optical system 106 and/or HMD 100. Furthermore, the infrared camera 116 could additionally represent a visible light camera with sensing capabilities in the infrared wavelengths.

The infrared light source 118 could represent one or more infrared light-emitting diodes (LEDs) or infrared laser diodes that may illuminate a viewing location. Thus, one or both eyes of a wearer of the HMD 100 may be illuminated by the infrared light source 118. The infrared light source 118 may be positioned along an optical axis common to the infrared camera, and/or the infrared light source 118 may be positioned elsewhere. The infrared light source 118 could be mounted separately from the optical system 106 and/or HMD 100. The infrared light source 118 may illuminate the viewing location continuously or may be turned on at discrete times. Additionally, when illuminated, the infrared light source 118 may be modulated at a particular frequency.

The HMD-tracking system 104 could be configured to provide a HMD position and HMD orientation to the processor 112. This position and orientation data may help determine a reference axis to which a gaze axis is compared. For instance, the reference axis may correspond to the orientation of the HMD.

The gyroscope 120 could be a microelectromechanical system (MEMS) gyroscope or a fiber optic gyroscope. The gyroscope 120 may be configured to provide orientation information to the processor 112. The GPS unit 122 could be a receiver that obtains clock and other signals from GPS satellites and may be configured to provide real-time location information to the processor 112. The HMD-tracking system 104 could further include an accelerometer 124 configured to provide motion input data to the processor 112.

The optical system 106 could represent components configured to provide virtual images to a viewing location. An example of optical system 106 is described in detail below.

Various peripheral devices 108 may be included in the HMD 100 and may serve to provide information to and from a wearer of the HMD 100. In one example, the HMD 100 may include a wireless communication interface 134 for wirelessly communicating with one or more devices directly or via a communication network. For example, wireless communication interface 134 could use 3G cellular communication, such as CDMA, EVDO, GSM/GPRS, or 4G cellular communication, such as WiMAX or LTE. Alternatively, wireless communication interface 134 could communicate with a wireless local area network (WLAN), for example, using WiFi. In some embodiments, wireless communication interface 134 could communicate directly with a device, for example, using an infrared link, Bluetooth, or ZigBee.

Although FIG. 1 shows various components of the HMD 100 (i.e., wireless communication interface 134, processor 112, memory 114, infrared camera 116, display panel 126, GPS 122, and user interface 115) as being integrated into HMD 100, one or more of these components could be physically separate from HMD 100. For example, infrared camera 116 could be mounted on the wearer separate from HMD 100. Thus, the HMD 100 could be part of a wearable computing device in the form of separate devices that can be worn on or carried by the wearer. The separate components that make up the wearable computing device could be communicatively coupled together in either a wired or wireless fashion.

Figure 2:
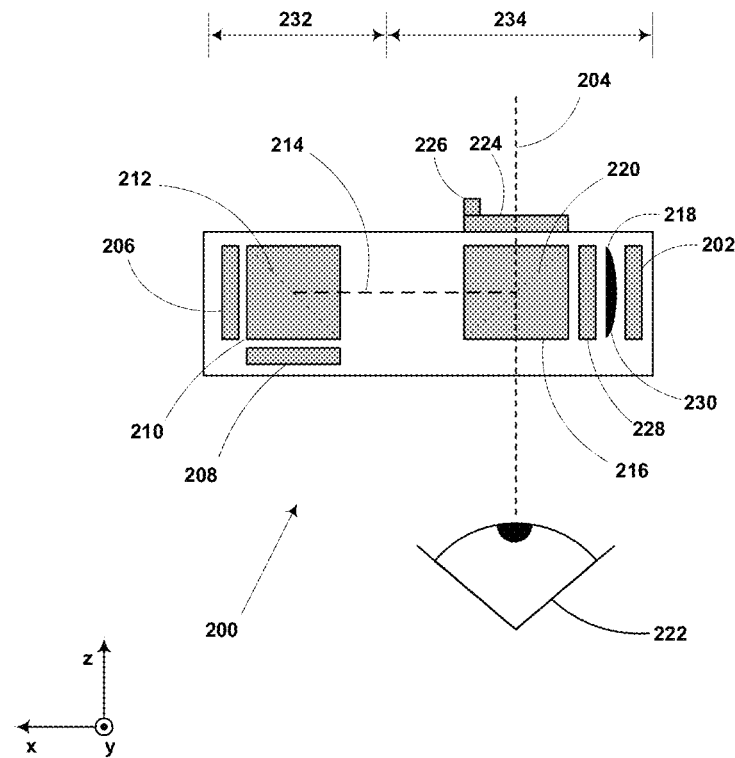
FIG. 2 is a top view of an optical system, in accordance with an example embodiment.

FIG. 2 illustrates a top view of an optical system 200 that is configured to display a virtual image superimposed upon a real-world scene viewable along a viewing axis 204. For clarity, a distal portion 232 and a proximal portion 234 represent optically-coupled portions of the optical system 200 that may or may not be physically separated. An example embodiment includes a display panel 206 that may be illuminated by a light source 208. Light emitted from the light source 208 is incident upon the distal beam splitter 210. The light source 208 may include one or more light-emitting diodes (LEDs) and/or laser diodes. The light source 208 may further include a linear polarizer that acts to pass one particular polarization to the rest of the optical system.

In an example embodiment, the distal beam splitter 210 is a polarizing beam splitter that reflects light depending upon the polarization of light incident upon the beam splitter. To illustrate, s-polarized light from the light source 208 may be preferentially reflected by a distal beam-splitting interface 212 towards the display panel 206. The display panel 206 in the example embodiment is a liquid crystal-on-silicon (LCOS) display, but could also be a digital light projector (DLP) micro-mirror display, or other type of reflective display panel. The display panel 206 acts to spatially-modulate the incident light to generate a light pattern. Alternatively, the display panel 206 may be an emissive-type display such as an organic light-emitting diode (OLED) display.

In the example in which the display panel 206 is a LCOS display panel, the display panel 206 generates a light pattern with a polarization perpendicular to the polarization of light initially incident upon the panel. In this example embodiment, the display panel 206 converts incident s-polarized light into a light pattern with p-polarization. The generated light pattern from the display panel 206 is directed towards the distal beam splitter 210. The p-polarized light pattern passes through the distal beam splitter 210 and is directed along an optical axis 214 towards the proximal region of the optical system 200. In an example embodiment, the proximal beam splitter 216 is also a polarizing beam splitter. The light pattern is at least partially transmitted through the proximal beam splitter 216 to the image former 218. In an example embodiment, image former 218 includes a concave mirror 230 and a proximal quarter-wave plate 228. The light pattern passes through the proximal quarter-wave plate 228 and is reflected by the concave mirror 230.

The reflected light pattern passes back through proximal quarter-wave plate 228. Through the interactions with the proximal quarter-wave plate 228 and the concave mirror 230, the light patterns are converted to the s-polarization and are formed into a viewable image. This viewable image is incident upon the proximal beam splitter 216 and the viewable image is reflected from proximal beam splitting interface 220 towards a viewing location 222 along a viewing axis 204. A real-world scene is viewable through a viewing window 224. The viewing window 224 may include a linear polarizer in order to reduce stray light within the optical system. Light from the viewing window 224 is at least partially transmitted through the proximal beam splitter 216. Thus, both a virtual image and a real-world image are viewable to the viewing location 222 through the proximal beam splitter 216.

Although FIG. 2 depicts the distal portion 232 of the optical system housing as to the left of the proximal portion 234 of the optical system housing when viewed from above, it is understood that other embodiments are possible to physically realize the optical system 200, including the distal portion 232 being configured to be to the right, below and above with respect to the proximal portion 234. Further, although an example embodiment describes an image former 218 as comprising a concave mirror 230, it is understood by those skilled in the art that the image former 218 may comprise a different optical element, such as an optical lens or a diffractive optic element.

In one embodiment, the proximal beam splitter 216, the distal beam splitter 210, and other components of optical system 200 are made of glass. Alternatively, some or all of such optical components may be partially or entirely plastic, which can also function to reduce the weight of optical system 200. A suitable plastic material is Zeonex® E48R cyclo olefin optical grade polymer which is available from Zeon Chemicals L.P., Louisville, Ky. Another suitable plastic material is polymethyl methacrylate (PMMA).

An example embodiment may include an infrared light source 226 that is configured to illuminate the viewing location 222. Although FIG. 2 depicts the infrared light source 226 as adjacent to viewing window 224, those skilled in the art will understand that the infrared light source 226 could be located elsewhere, such as on the side of the proximal beam splitter 216 that is adjacent to the viewing location 222 or in the distal portion 232 of the optical system 200. The infrared light source 226 may represent, for example, one or more infrared light-emitting diodes (LEDs). Infrared LEDs with a small size may be implemented, such as the Vishay Technology TSML 1000 product.

Further, those skilled in the art will understand that, for best eye-tracking accuracy, it may be advantageous to obtain infrared images of the eye pupil using light sources that illuminate the eye from positions off-axis and/or on-axis with respect to the viewing axis 204. Therefore, the infrared light source 226 may include one or more LEDs located at different locations in the optical system 200.

Infrared light generated from the infrared light source 226 is configured to be incident upon the viewing location 222. Thus, the wearer's eye pupil may be illuminated with the infrared light. The infrared light may be reflected from the wearer's eye back along the viewing axis 204 towards the proximal beam splitter 216. A portion of the reflected infrared light may be reflected from the beam splitting interface 220 towards the image former 218.

In order to transmit infrared light to an infrared camera 202, the image former 218 may include a dichroic thin film configured to selectively reflect or transmit incident light depending upon the wavelength of the incident light. For instance, the dichroic thin film may be configured to pass infrared light while reflecting visible light. In an example embodiment, the visible light pattern generated by the display panel 206 may be reflected by the concave mirror 230 and the visible light pattern may be formed into a viewable image. The infrared light may thus be preferably transmitted through the concave mirror 230 to infrared camera 202. Dichroic thin film coatings are available commercially from companies such as JML Optical Industries and Precision Glass & Optics (PG&O) and comprise multiple layers of dielectric and/or metal films. These dichroic coatings are also called 'cold mirrors'.

In an example embodiment, a small aperture or apertures may be introduced into the image former 218, which may be realized by one or more pinholes in the concave mirror 230. In this example embodiment, most of the visible and infrared light is reflected off of and formed by the image former 218 into an image viewable by the HMD wearer. Some of the visible and infrared light passes through the aperture and is incident upon the infrared camera 202. The infrared camera 202 may selectively filter and detect the infrared light from the combination of visible and infrared light to obtain information regarding the wearer's eye pupil location. Alternatively, the infrared light source 226 may be modulated to provide a frequency reference for a lock-in amplifier or phase-locked loop in order that the infrared light signal is obtained efficiently. Also, the visible light source 208 may be modulated and infrared light detection could be performed when the visible light source 208 is off, for example. Those with skill in the art will understand that there are other variations of transducing an infrared light signal mixed with a visible light signal with an infrared camera and that those variations are included implicitly in this specification.

Figure 3A:
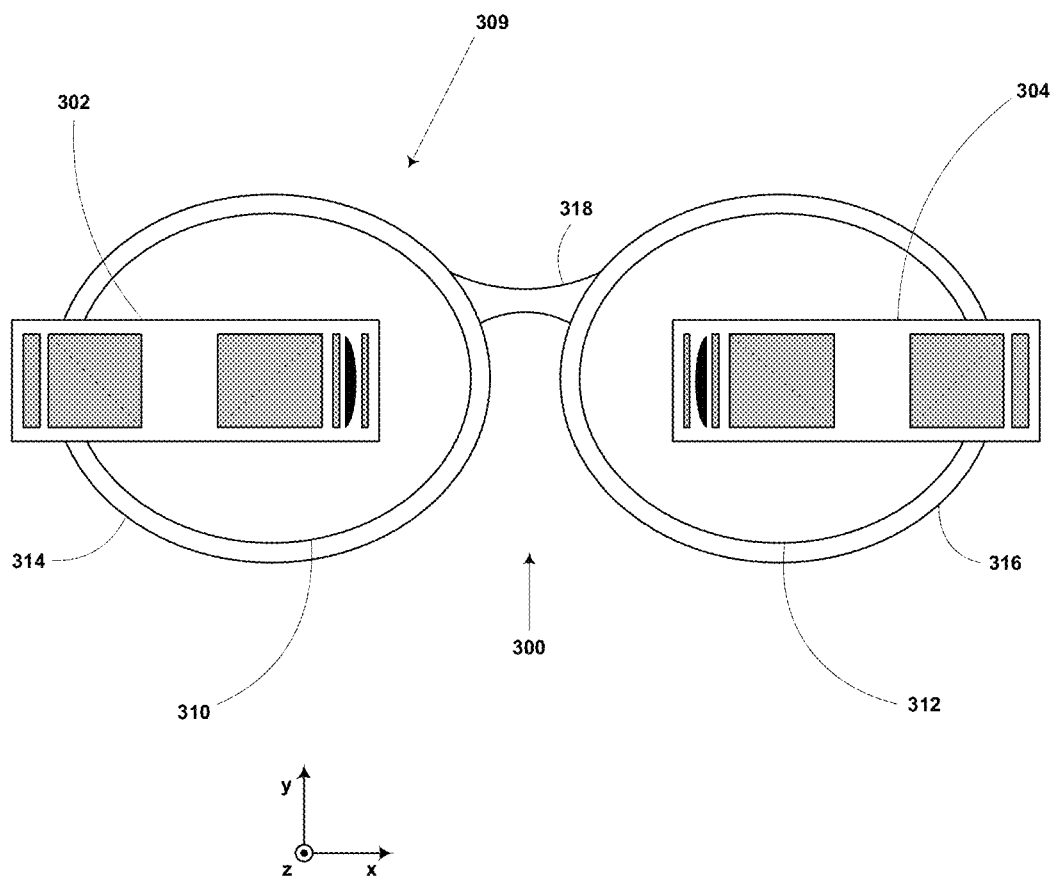
FIG. 3A is a front view of a head-mounted display, in accordance with an example embodiment.
Figure 3B:
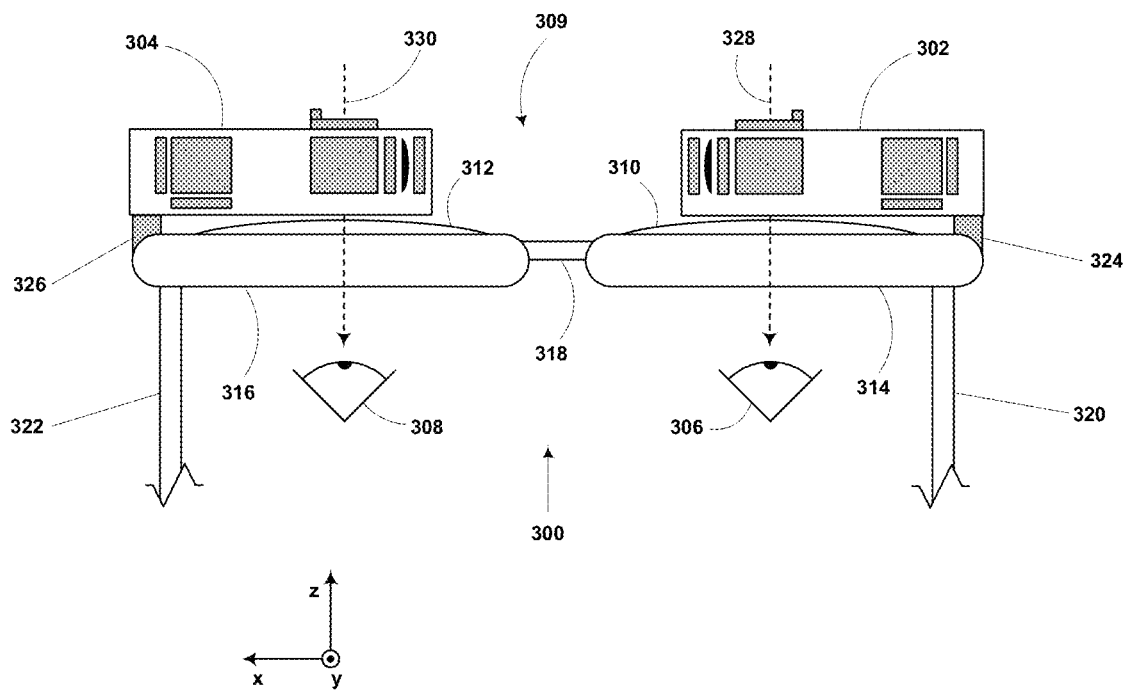
FIG. 3B is a top view of the head-mounted display of FIG. 3A, in accordance with an example embodiment.
Figure 3C:
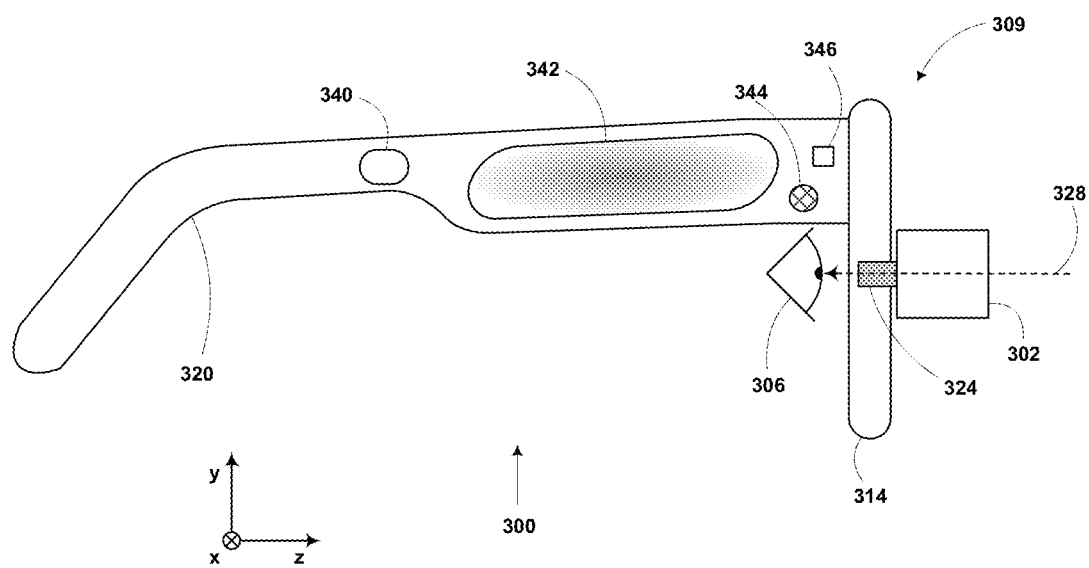
FIG. 3C is a side view of the head-mounted display of FIG. 3A and FIG. 3B, in accordance with an example embodiment.

FIG. 3A presents a front view of a head-mounted display (HMD) 300 in an example embodiment that includes a head-mounted support 309. FIGS. 3B and 3C present the top and side views, respectively, of the HMD in FIG. 3A. Although this example embodiment is provided in an eyeglasses format, it will be understood that wearable systems and HMDs may take other forms, such as hats, goggles, masks, headbands and helmets. The head-mounted support 309 includes lens frames 314 and 316, a center frame support 318, lens elements 310 and 312, and extending side-arms 320 and 322. The center frame support 318 and side-arms 320 and 322 are configured to secure the head-mounted support 309 to the wearer's head via the wearer's nose and ears, respectively. Each of the frame elements 314, 316, and 318 and the extending side-arms 320 and 322 may be formed of a solid structure of plastic or metal, or may be formed of a hollow structure of similar material so as to allow wiring and component interconnects to be internally routed through the head-mounted support 309. Alternatively or additionally, head-mounted support 309 may support external wiring. Lens elements 310 and 312 are at least partially transparent so as to allow the wearer to look through them. In particular, the wearer's left eye 308 may look through left lens 312 and the wearer's right eye 306 may look through right lens 310. Optical systems 302 and 304, which may be configured as shown in FIG. 2, may be positioned in front of lenses 310 and 312, respectively, as shown in FIGS. 3A, 3B, and 3C. Optical systems 302 and 304 may be attached to the head-mounted support 309 using support mounts 324 and 326, respectively. Furthermore, optical systems 302 and 304 may be integrated partially or completely into lens elements 310 and 312, respectively.

Although this example includes an optical system for each of the wearer's eyes, it is to be understood that a HMD might include an optical system for only one of the wearer's eyes (either left eye 308 or right eye 306). As described in FIG. 2, the HMD wearer may simultaneously observe from optical systems 302 and 304 a real-world image with an overlaid virtual image. The HMD 300 may include various elements such as a processor 340, a touchpad 342, a microphone 344, and a button 346. The computer 340 may use data from, among other sources, various sensors and cameras to determine the virtual image that should be displayed to the user. In an example embodiment, as described earlier, an infrared light source or sources may illuminate the viewing position(s) 308 and 306, i.e. the wearer's eye(s), and the reflected infrared light may be preferentially collected with an infrared camera.

Those skilled in the art would understand that other user input devices, user output devices, wireless communication devices, sensors, and cameras may be reasonably included in such a wearable computing system.

Figure 4A:
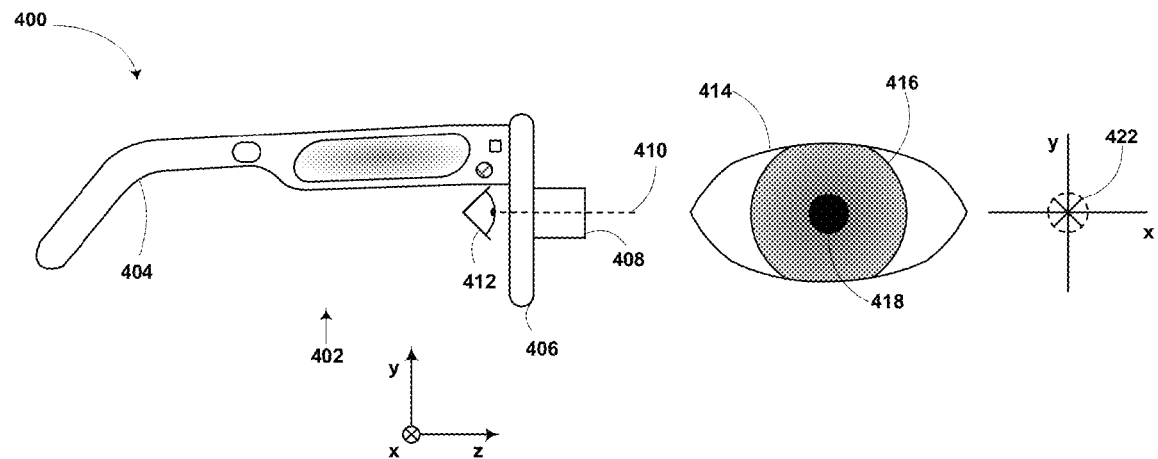
FIG. 4A is a side view of a head-mounted display with a forward gaze axis, in accordance with an example embodiment.
Figure 4B:
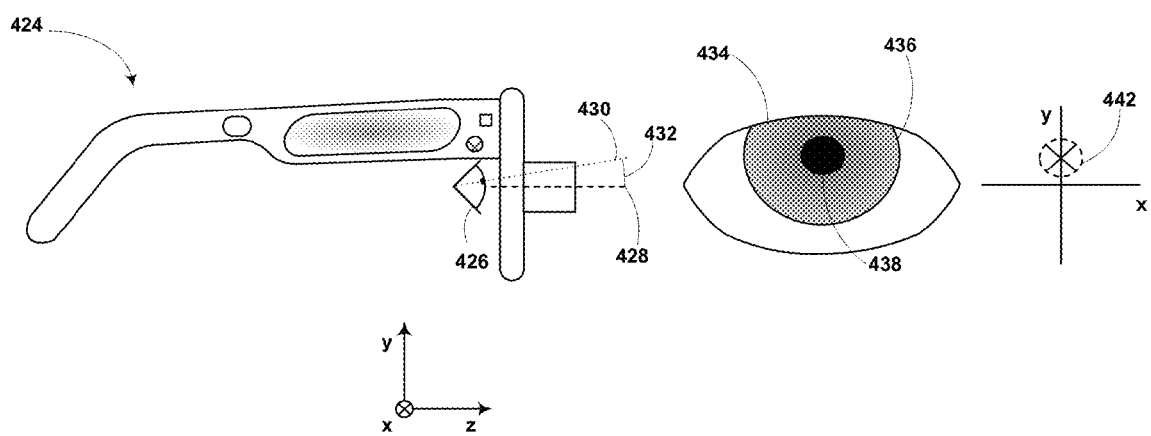
FIG. 4B is a side view of the head-mounted display of FIG. 4A with an upward gaze axis, in accordance with an example embodiment.

FIGS. 4A and 4B depict side and front views of an eye as well as schematic drawings of pupil location information under different conditions. One way to determine a gaze axis of a person is to ascertain the position of the person's eye pupil with respect to a reference point, such as a viewing location. To track eye pupil movements, infrared light is generally reflected off of a person's eye. The reflected light may be collected and detected with an infrared detector. Upon imaging of the eye, image processing can be conducted with a processor 112 in order to determine, for instance, the extents and centroid location of the person's pupil. The other known means and methods of eye-tracking, including the use of visible light illumination and/or imaging techniques are possible.

For example, in an embodiment 400, a person may be looking directly forward as depicted in FIG. 4A. The eye 412 is open and the pupil 418 is located along a reference axis 410. After image processing, which may include edge detection, the position of the pupil may be determined to be at pupil location 422. In this example, the processor 112 may subsequently determine that the gaze axis based on the pupil location 422 coincides with a reference axis 410. Virtual image display position and movement may be adjusted due to the determined pupil location 422. For instance, the processor 112 may adjust a tracking rate to zero when the gaze axis and the reference axis are equivalent or nearly equivalent. This may allow a user to slowly read critical text or closely examine a virtual image, for example.

In an example embodiment 424, as illustrated in FIG. 4B, a person may be looking upwards with respect to a reference axis 428. The eye 434 is open and the pupil location is generally higher than a reference point 440. In this situation, imaging the person's pupil 438 with infrared light may result in a determined pupil position 442. The processor 112 may determine that the gaze axis 430 that is above the reference axis 428. The angle difference 432 may represent the absolute difference in angle between the reference axis 428 and the gaze axis 430. The processor 112 may calculate the angle difference 432 and, based on the angle difference 432, adjust a tracking rate. For instance, a large angle difference 432 could represent an adjustment in tracking rate such that the tracking rate is higher, for instance to scroll a virtual image across a field of view at a faster rate.

Other embodiments could include the use of different eye gaze determination techniques. For instance, instead of using the eye pupil to determine gaze axis, it is possible to track eye motions using the boundary between the sclera and iris (416 and 436 in FIGS. 4A and 4B). For the purposes of determining an eye gaze axis, finding the centroid of the sclera/iris boundary may be equivalent to finding the centroid of a pupil.

3. A Method for Adjusting Virtual Images within a Field of View Based on a Gaze Axis, a Reference Axis, and a Tracking Rate.

Figure 5:
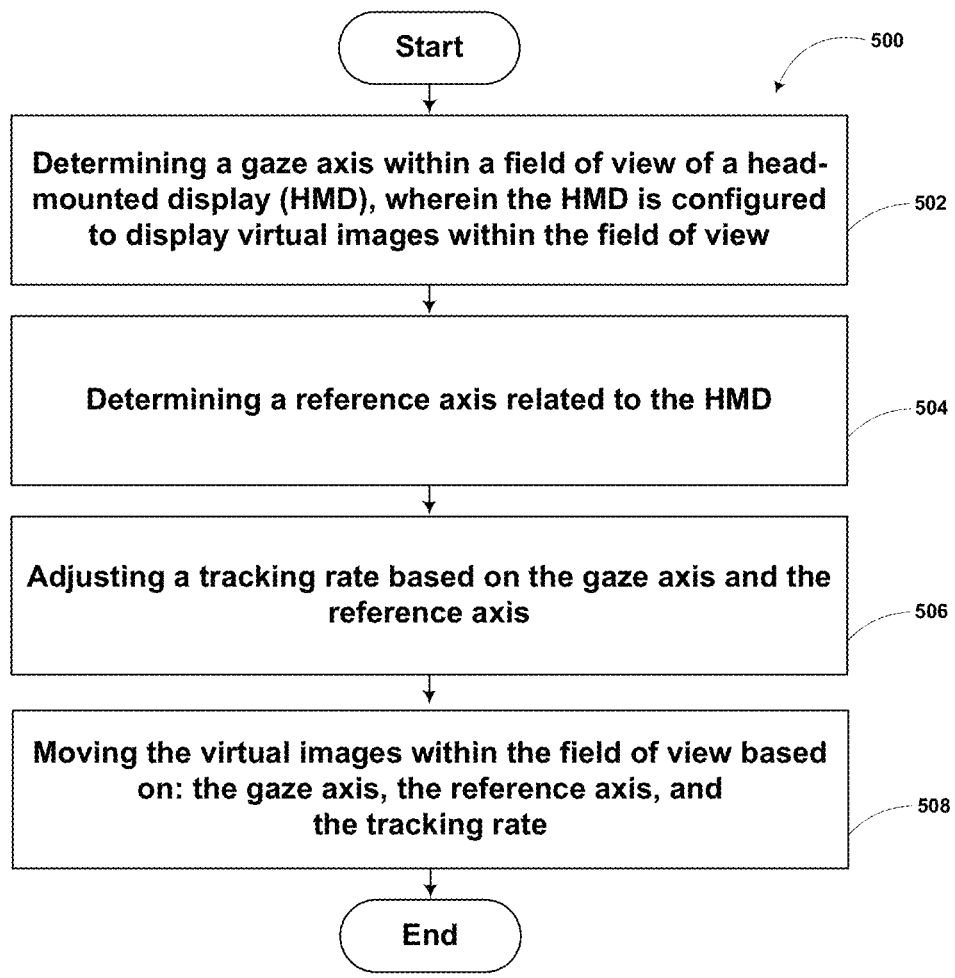
FIG. 5 is a flowchart of a method, in accordance with an example embodiment.

A method 500 is provided for adjusting virtual images within a field of view based on a gaze axis, a reference axis and a tracking rate. Method 500 could be performed using an HMD that is configured as shown in any of FIGS. 1-3C or configured in some other way. FIG. 5 illustrates the steps in an example method, however, it is understood that in other embodiments, the steps may appear in different order and steps may be added or subtracted.

In the method, a gaze axis is determined within a field of view of a head-mounted display (HMD) (Step 502). The HMD is generally configured to display virtual images to be viewable at a viewing location and could be an HMD similar to an aforementioned embodiment. The gaze axis could be determined to be an axis extending from a center of the HMD wearer's pupil. The gaze axis could be similar to the gaze axis 430 depicted in FIG. 4B. The pupil location could be determined using eye glint images or by other eye-tracking techniques detailed above.

A reference axis related to the HMD may also be determined in the method (Step 504). The reference axis could be determined by the processor 112 based on the orientation of the HMD and may correspond to the apparent center of the HMD field of view, for example. Other reference axes are possible.

A tracking rate related to the movement of virtual images may be adjusted based on the gaze axis and the reference axis (Step 506). The tracking rate may be the rate at which virtual images are panning and/or scrolling across the HMD field of view. The tracking rate may depend upon the data that is displayed. For instance, words on a document may scroll in a vertical fashion from the bottom to the top of the HMD field of view to simulate reading downwards along a printed page. In this case, the display may move the text upwards at a tracking rate of around 1 second per line.

A tracking rate could also be related to the motion of a HMD wearer. For instance, when displaying virtual images that may be user interface menus, for instance, the HMD may attempt to base the tracking rate of the virtual images on the rate of HMD movement. More specifically, an HMD wearer may access a user interface by changing the orientation of the HMD (for instance rotating one's head and/or body to select different elements of the user interface). Thus, the user interface could be at least partially anchored to locations and objects in the real world and the virtual images could be adjusted or panned at a rate proportional to the rate of change of the HMD orientation.

Further, the tracking rate could be adjusted by the angle difference between the gaze axis and the reference axis. For instance, the tracking rate could be increased if the angle difference between the gaze axis and the reference axis is large and the tracking rate could be decreased if the angle difference is small. The tracking rate could also be adjusted based on the direction of the vector between the reference axis and the gaze axis. More detailed examples are given below.

The virtual images may be adjusted within the field of view based on the gaze axis, the reference axis, and the tracking rate (Step 508). If the tracking rate is adjusted lower, the movement rate of the virtual images may slow, for instance. Conversely, with a higher tracking rate, the virtual images may appear to move more quickly within the field of view.

FIGS. 6A, 6B, 6C, and 6D illustrate an example in which a determined gaze axis controls text scrolling. In the example embodiment 600, virtual images including text are presented within a field of view 602. The text 604 may be scrolling slowly upwards at a normal tracking rate similar in fashion to credits at the end of a movie (around one line per second, for instance). A gaze point 606 may be ascertained related to a gaze axis and thus to the position of an eye pupil of a wearer of an HMD. In this example embodiment, the reference axis may be considered as originating from the wearer's eye and going through the apparent center of the field of view 602. When a wearer is reading normally and the angle between the reference axis and the gaze axis is relatively small, the tracking rate may stay unchanged and the text 604 may continue to scroll upwards.

Figure 6A:
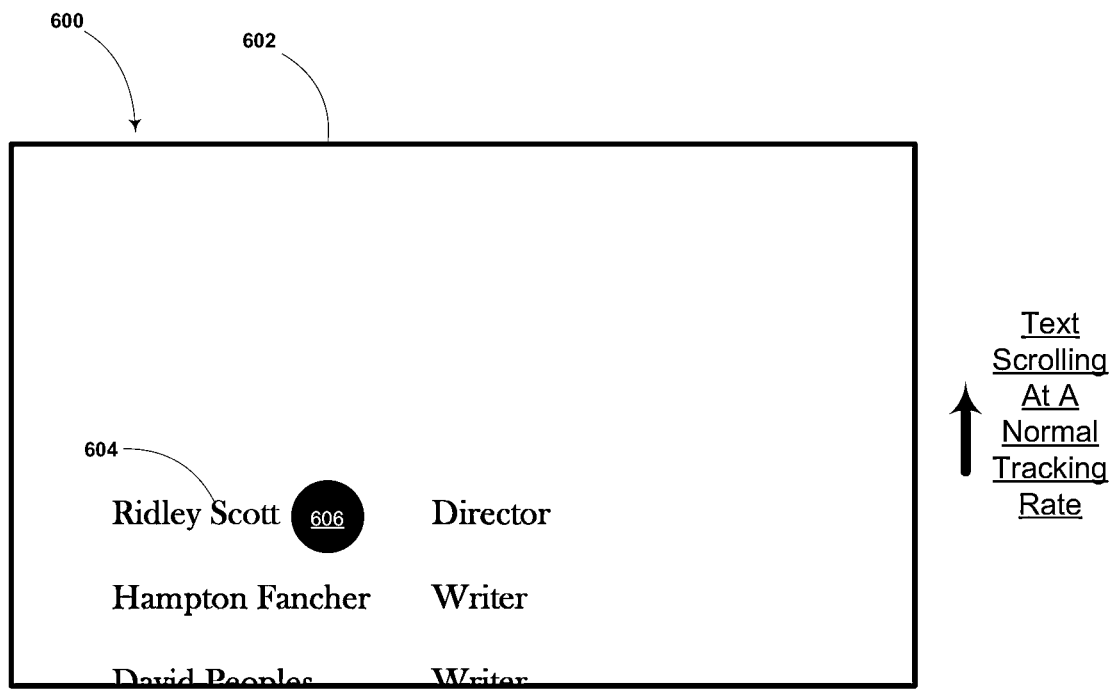
FIG. 6A is a field of view of a head-mounted display showing scrolling text, in accordance with an example embodiment.
Figure 6B:
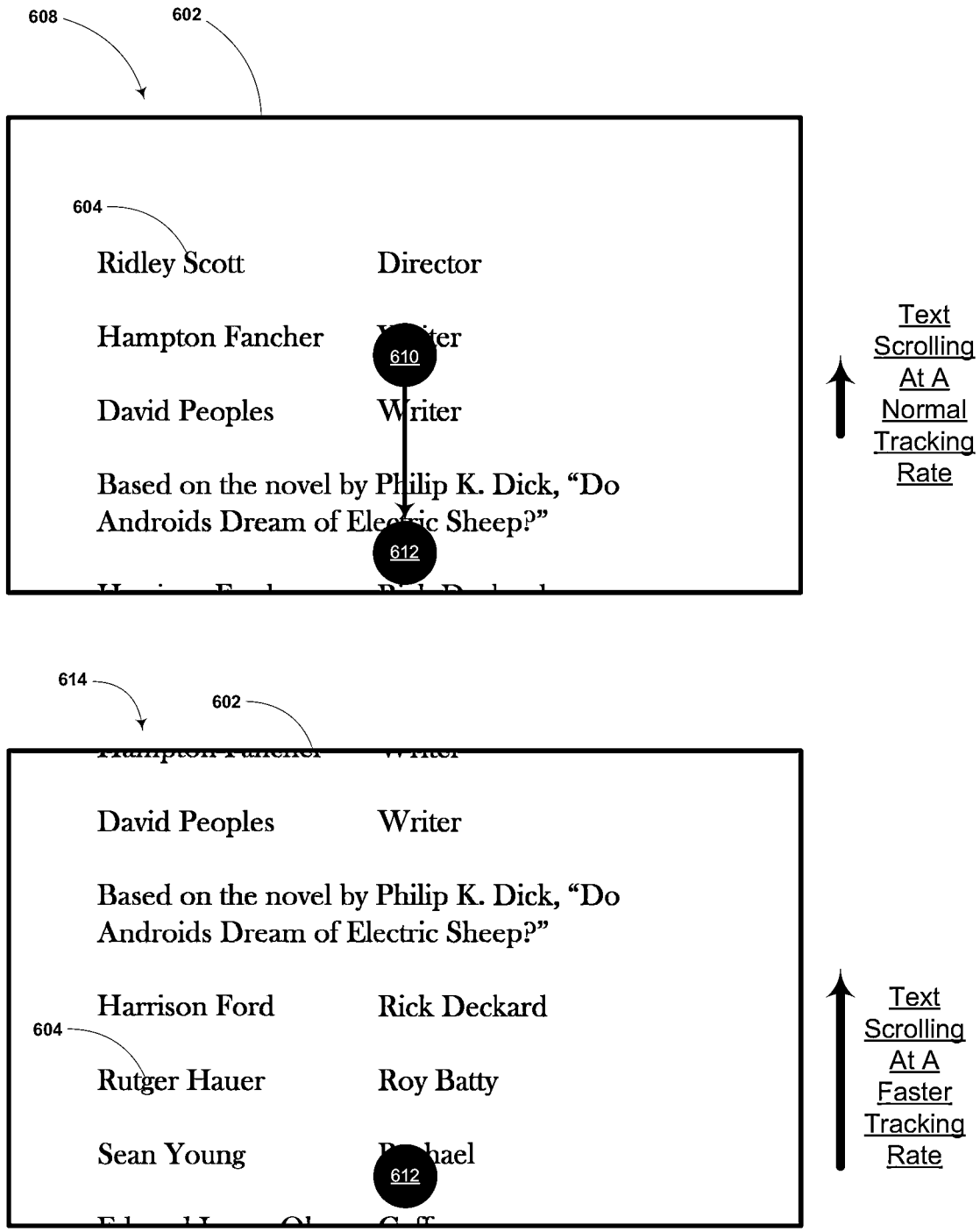
FIG. 6B is a field of view of a head-mounted display showing scrolling text, in accordance with an example embodiment.

In FIG. 6B, the wearer of the HMD may move his or her gaze point from a central location 610 to a location near the bottom of the field of view 612, as shown in a particular field of view 608. When this change in eye gaze point is detected by the processor 112, the processor 112 may adjust the tracking rate of the virtual images to increase the tracking rate, such as illustrated in field of view 614. In particular, the processor 112 may determine that the wearer is reading quickly and try to supply more text by increasing the tracking rate. Thus, the upward movement rate of text 604 may increase.

Figure 6C:
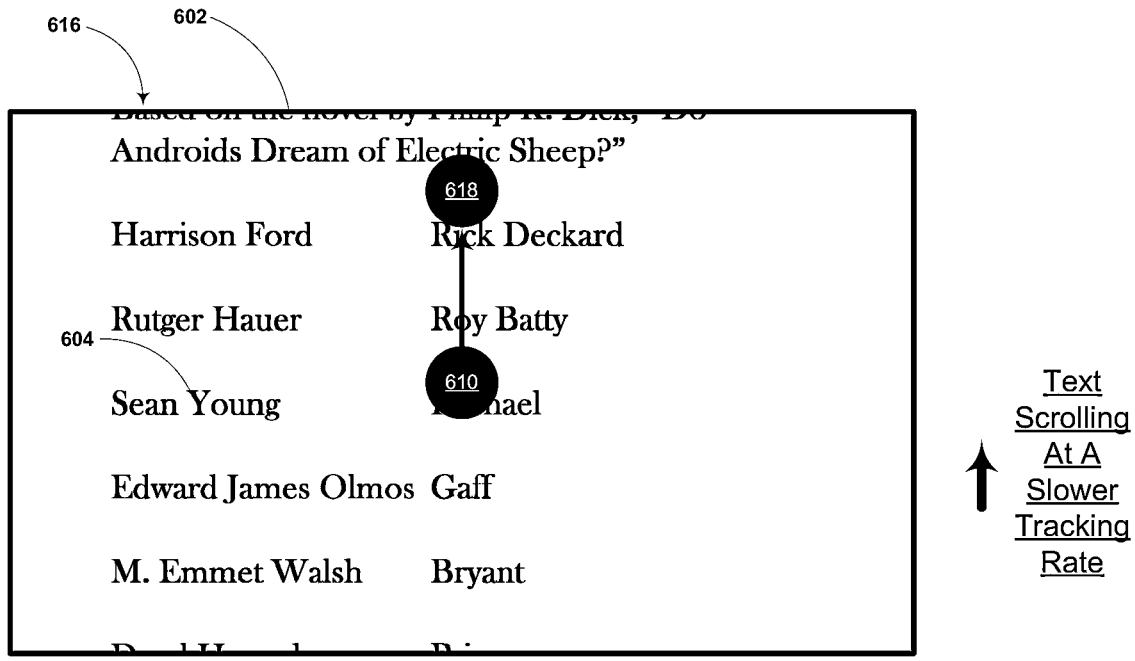
FIG. 6C is a field of view of a head-mounted display showing scrolling text, in accordance with an example embodiment.

In a related scenario 616 depicted in FIG. 6C, while text 604 is scrolling upward within a HMD field of view 602, the wearer of the HMD may move his or her gaze point from a central location 610 to a location 618 near the top of the field of view 602. When this change in eye gaze point is detected by the processor 112, the processor 112 may adjust the tracking rate of the virtual images to decrease the tracking rate. In particular, the processor 112 may determine that the wearer is reading slowly and try to supply text to the reader's eye more slowly by decreasing the tracking rate. Thus, the upward movement rate of text 604 may decrease.

Figure 6D:
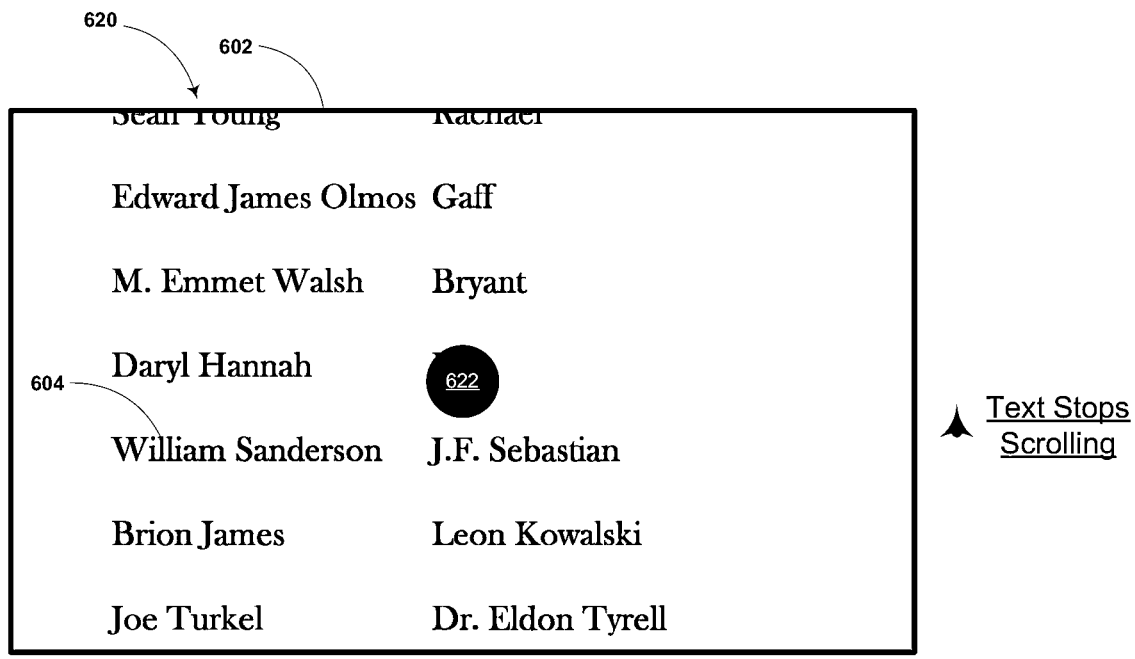
FIG. 6D is a field of view of a head-mounted display showing scrolling text, in accordance with an example embodiment.

FIG. 6D depicts a scenario 620 wherein a tracking rate may be adjusted to zero. For example, while text 604 is scrolling upward within a HMD field of view 602, the wearer of the HMD may move his or her gaze point to a central location 622 of the field of view 602, as shown in a particular field of view 616. Further, the wearer of the HMD may fixate his or her eye gaze point upon the central location 622 for some predetermined period of time. When this eye gaze point position and/or the eye gaze point fixation is detected by the processor 112, the processor 112 may adjust the tracking rate of the virtual images to further decrease or zero the tracking rate. In particular, the processor 112 may determine that the wearer wants to focus on a particular element of the virtual image and may provide a more stable virtual image by decreasing or zeroing the tracking rate. Thus, the movement of text 604 may decrease further in rate or stop completely. Furthermore, gaze axis movements near the reference axis may provide for smaller tracking rates than gaze axis movements at larger angle differences. Thus, eye gaze movements around a reference axis may provide finer virtual image tracking control while gazing farther away from the reference axis may provide coarse virtual image panning and scrolling tracking control.

FIGS. 6A, 6B, 6C, and 6D illustrate an example embodiment in which an HMD may adjust text scrolling while the HMD could be stationary. However, example embodiments in which the HMD adjusts virtual images while simultaneously translating and/or rotating may also be considered.

For instance, a HMD may display a user interface in which the virtual images are substantially anchored to the real-world environment. This 'world-fixed' user interface could appear to the HMD user as though the virtual images of the user interface are substantially fixed to an inside surface of an imaginary ring that surrounds the user's head. That is, when a HMD user turns his or her head to the left, the virtual images rotate within his or her field of view to the right, and vice versa.

In one situation, the HMD user may access and navigate menus and icons in the user interface by moving the HMD and by using the aforementioned HMD reference axis as a pointing device or cursor. However, accessing this menu may be complicated if the HMD user is in motion. For instance, when travelling on a subway, the HMD user may round a corner, which may affect the HMD position as well as orientation. Thus, a user interface menu controlled only by the HMD position and/or orientation may produce errors when the HMD changes its relative reference position such as inadvertent menu selection or rotation of icons in the viewable user interface.

In an example embodiment, the utilization of an eye-tracking system could reduce inadvertent movement of the virtual images due to changes in HMD position and orientation. For instance, if the HMD position and/or orientation changes but the eye-tracking system detects no corresponding eye movement (anticipatory eye gaze changes, for example), the HMD may be configured to not adjust the virtual images with respect to the changing HMD position.

Figure 7A:
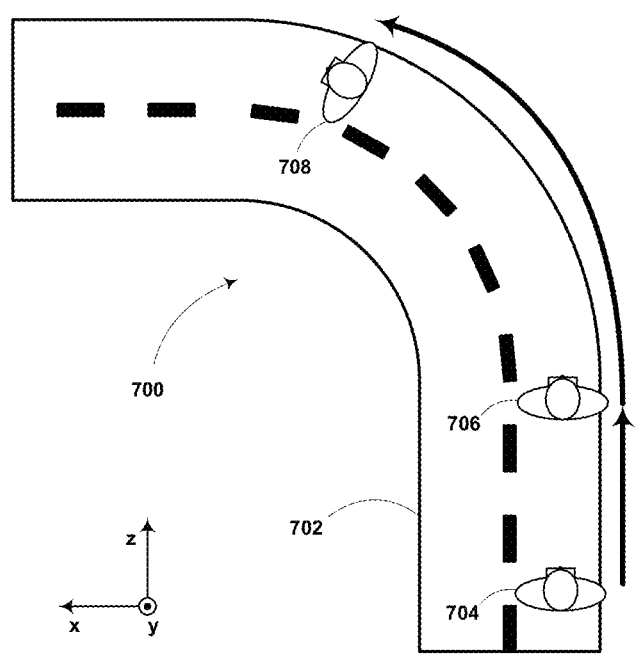
FIG. 7A is an overhead view of HMD user traveling on a subway, in accordance with an example embodiment.

The example embodiment 700 is illustrated in FIG. 7A in which the HMD user is riding a subway forward (position 704 to position 706) and then the subway curves left (position 706 to position 708). In the example embodiment 712, the HMD user may be accessing a user interface menu that could include icons and/or menus associated with files 718, photos 720, e-mail 722, contacts 724 and a calendar 726. FIG. 7B illustrates a possible view that the HMD user may see when located at position 704. The e-mail menu 722 could be centered within the HMD display 714 and the gaze point 710 could be determined to be near the center of the HMD display 714.

As described above, the user interface icons and/or menus could be arranged in imaginary ring that surrounds the HMD user's head. In the example embodiment 712, if at rest, the user interface may be configured to remain substantially 'world-fixed' and rotate in the opposite direction at least due to HMD panning and eye gaze change. For instance, if the HMD user rotates the HMD to the right and gazes towards the right side of the HMD display 714, the user interface menus may rotate to the left, allowing the contacts 724 and calendar 726 to be displayed in the HMD display 714.

However, as shown in FIG. 7C, displacements, such as moving straight ahead may not necessarily create a change in the displayed objects. For instance, if the HMD user moves forward in the subway car from position 704 to position 706, the menu may stay substantially the same. Alternatively, displacements in HMD location could represent inputs that may cause the displayed objects to be adjusted. For instance, physical movements of the HMD could represent 'walking' through the user interface in three-dimensional space.

FIG. 7D illustrates an embodiment 732 where the HMD user may be travelling on the subway car at position 708. At that position 708, the HMD user is traveling forward and also rotating gradually to the left. If the user interface is not corrected by an eye-tracking system, the controller may interpret the HMD movement as an intentional movement to turn left. In general, this motion may lead to rotating the menus to the right. In this case, the photos 720 menu may be moved towards the center of the HMD display 716.

However, FIG. 7E illustrates an embodiment 736 that may use an eye-tracking system to correctly determine the actual desired speed of user interface movement. In this case, the HMD user is moving through position 708, while moving forward and rotating to the left. At the same time, an eye gaze point 738 may be determined to remain at the center of the HMD display 716. The eye gaze fixation may cause the menu to not rotate.

Other embodiments of adjusting the tracking rate of virtual images in an HMD system are possible and are not meant to be limited by the above discussion. Those skilled in the art will understand that HMDs may present many different types of information in the form of virtual images to a wearer. Accordingly, each of these various virtual images may be assigned a different tracking rate and vector, which may be based on at least one or more context-related factors such as wearer reading speed, HMD orientation, HMD motion, HMD location, gaze axis, etc.

A further example of how gaze direction may be used to correct for motion of the HMD is illustrated by the pseudocode set forth below in Table 1. The routine may be called every time that there is a new sensor reading relating to the orientation of the HMD, for example, a sensor reading from gyroscope 120, accelerometer 124, or other component of HMD-Tracking system 104. The routine is able to calculate two variables, adjustedX and adjustedY, which relate to how far the displayed images are to be moved in the x and y directions, respectively, using the moveScreen (adjustedX, adjustedY) function. Specifically, the variables dx and dy, which represent the distances that the wearer's head has travelled in the x and y directions, respectively, are determined from the sensor data. The variables vx and vy, which represent the x and y displacements between the wearer's gaze location on the screen and the center of the screen, may be calculated based on the angle difference between the gaze axis and a reference axis that goes through the center of the screen. The variable adjustedX may then be calculated as a function of dx and vx, and the variable adjustedY may be calculated as a function of dy and vy. In this way, the wearer of the HMD is able to keep the position of the displayed images fixed, notwithstanding motion of the HMD, by gazing at the center of the screen.

TABLE 1

```
var radiusX = adjustable number of units;
var radiusY = adjustable number of units;
// callback method that is called every time there is a new sensor reading.
function handleHeadMovement( ) {
// calculate the distance the head has moved. This distance might
// be faulty due to sensor drift or unintended movement of the wearer,
// as when riding the subway or walking around a corner
var dx = relative distance that the head travelled on the x axis;
var dy = relative distance that the head travelled on the y axis;
// calculate the variance of the eye gaze from the center of the screen
var vx = distance the eye gaze is from the center of the screen on the
x axis;
var vy = distance the eye gaze is from the center of the screen on the
y axis;
// adjust the distance travelled based on the distance the eye gaze is from
// the center. Make sure that the distance travelled is only decremented,
// never augmented
var adjustedX = dx * Math.min( 1, vx / radiusX );
var adjustedY = dy * Math.min( 1, vy / radiusY );
// move the screen to reflect the adjusted movement.
moveScreen( adjustedX, adjustedY );
}
```

4. Non-Transitory Computer Readable Medium to Determine Speed of Image Movement Using Eye Gaze Detection.

Some or all of the functions described above in method 500 and illustrated in FIGS. 5, 6A, 6B, 6C, 6D, 7A, 7B, 7C, 7D, and 7E may be performed by a computing device in response to the execution of instructions stored in a non-transitory computer readable medium. The non-transitory computer readable medium could be, for example, a random access memory (RAM), a read-only memory (ROM), a flash memory, a cache memory, one or more magnetically encoded discs, one or more optically encoded discs, or any other form of non-transitory data storage. The non-transitory computer readable medium could also be distributed among multiple data storage elements, which could be remotely located from each other. The computing device that executes the stored instructions could be a wearable computing device, such as a wearable computing device 100 illustrated in FIG. 1. Alternatively, the computing device that executes the stored instructions could be another computing device, such as a server in a server network. A non-transitory computer readable medium may store instructions executable by the processor 112 to perform various functions. For instance, instructions that could be used to carry out method 500 may be stored in memory 114 and could be executed by processor 112. In such an embodiment, upon receiving gaze information from the eye-tracking system 102, the processor 112 carry out instructions to determine a gaze axis and a reference axis as well as to control the HMD 100 to display virtual images within the HMD field of view and adjust a tracking rate based on the gaze axis and the reference axis.

CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A head-mountable display (HMD), comprising:
a head-mountable support;
an optical system attached to the head-mountable support, wherein the optical system comprises a display panel configured to generate a virtual image, wherein the virtual image is viewable from a viewing location;
an infrared light source configured to illuminate the viewing location with infrared light such that infrared light is reflected from the viewing location as reflected infrared light;
a camera configured to image the viewing location by collecting the reflected infrared light; and
a computer configured to (i) determine a gaze axis based on one or more images of the viewing location obtained by the camera, (ii) determine a reference axis related to the HMD, (iii) adjust a tracking rate based on at least the gaze axis and the reference axis, and (iv) control the display panel to move the virtual images within a field of view based on the tracking rate.

2. The HMD of claim 1, wherein the viewing location corresponds to a location of at least one eye of a wearer of the HMD.

3. The HMD of claim 2, wherein the computer is configured to determine the location of the pupil of the at least one eye of a wearer of the HMD from the received images.

4. The HMD of claim 2, wherein the display panel is configured to generate the virtual image by spatially modulating visible light from the visible light source.

5. The HMD of claim 1, wherein the optical system further comprises a visible light source.

6. The HMD of claim 1, wherein the infrared light source comprises an infrared light-emitting diode (LED).

7. The HMD of claim 1, wherein the camera comprises an infrared camera.

8. The HMD of claim 1, wherein the reference axis related to the HMD corresponds to a central axis of the field of view.

9. The HMD of claim 1, wherein the reference axis related to the HMD comprises an axis that extends from the viewing location to a target object.

10. The HMD of claim 1, wherein the reference axis related to the HMD corresponds to an orientation of the HMD.

11. The HMD of claim 1, wherein the computer is configured to adjust the tracking rate based on at least an angle difference between the gaze axis and the reference axis.

12. The HMD of claim 11, wherein the computer is configured to adjust the tracking rate such that the tracking rate increases with increasing angle difference between the gaze axis and the reference axis.

13. The HMD of claim 1, wherein the computer is configured to adjust the tracking rate also based on movement of the HMD.

14. The HMD of claim 1, wherein the virtual images comprise text and the tracking rate comprises a scroll rate of the text.

* * * * *